(12) United States Patent
Nefcy

(10) Patent No.: US 8,834,319 B2
(45) Date of Patent: Sep. 16, 2014

(54) BIASED SPEED CONTROL FOR AN ELECTRIC MACHINE IN A HYBRID VEHICLE

(75) Inventor: Bernard D. Nefcy, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 235 days.

(21) Appl. No.: 13/465,161

(22) Filed: May 7, 2012

(65) Prior Publication Data

US 2013/0296104 A1 Nov. 7, 2013

(51) Int. Cl.
*B60W 10/02* (2006.01)
*B60W 10/08* (2006.01)
*B60W 10/04* (2006.01)
*H02P 15/00* (2006.01)

(52) U.S. Cl.
USPC .................... 477/6; 477/5; 477/8; 180/65.23

(58) Field of Classification Search
USPC .................................. 477/5, 6, 8; 180/65.23
See application file for complete search history.

(56) References Cited

U.S. PATENT DOCUMENTS

| 7,610,892 B2 | 11/2009 | Butcher et al. |
| 2007/0278022 A1 | 12/2007 | Tanishima |
| 2008/0032857 A1* | 2/2008 | Gohring et al. .................... 477/5 |
| 2009/0124452 A1* | 5/2009 | Fuechtner et al. ................. 477/5 |
| 2011/0118078 A1* | 5/2011 | Kraska et al. ...................... 477/5 |
| 2012/0158224 A1* | 6/2012 | Naqvi et al. ..................... 701/22 |
| 2012/0203417 A1* | 8/2012 | Matsui ............................. 701/22 |

FOREIGN PATENT DOCUMENTS

| JP | 2010167803 A | 8/2010 |
| JP | 2010190267 A | 9/2010 |
| JP | 2010202114 A | 9/2010 |

\* cited by examiner

*Primary Examiner* — Tisha Lewis
(74) *Attorney, Agent, or Firm* — Brooks Kushman P.C.; David B. Kelley

(57) ABSTRACT

A vehicle is provided with an engine, an electric machine connected to the engine by an upstream clutch, a transmission gearbox connected to the electric machine by a downstream clutch, and a controller. The controller is configured to: (i) slip a downstream clutch, (ii) limit a torque output of an electric machine to a threshold value, (iii) engage an upstream clutch while the downstream clutch is slipping, and (iii) engage the downstream clutch. A method for controlling an electric machine in a vehicle during an upstream torque disturbance is provided. The downstream clutch is slipped and the torque output of an electric machine is limited to a threshold value. The upstream clutch is engaged while the downstream clutch is slipping. The downstream clutch is engaged.

19 Claims, 2 Drawing Sheets

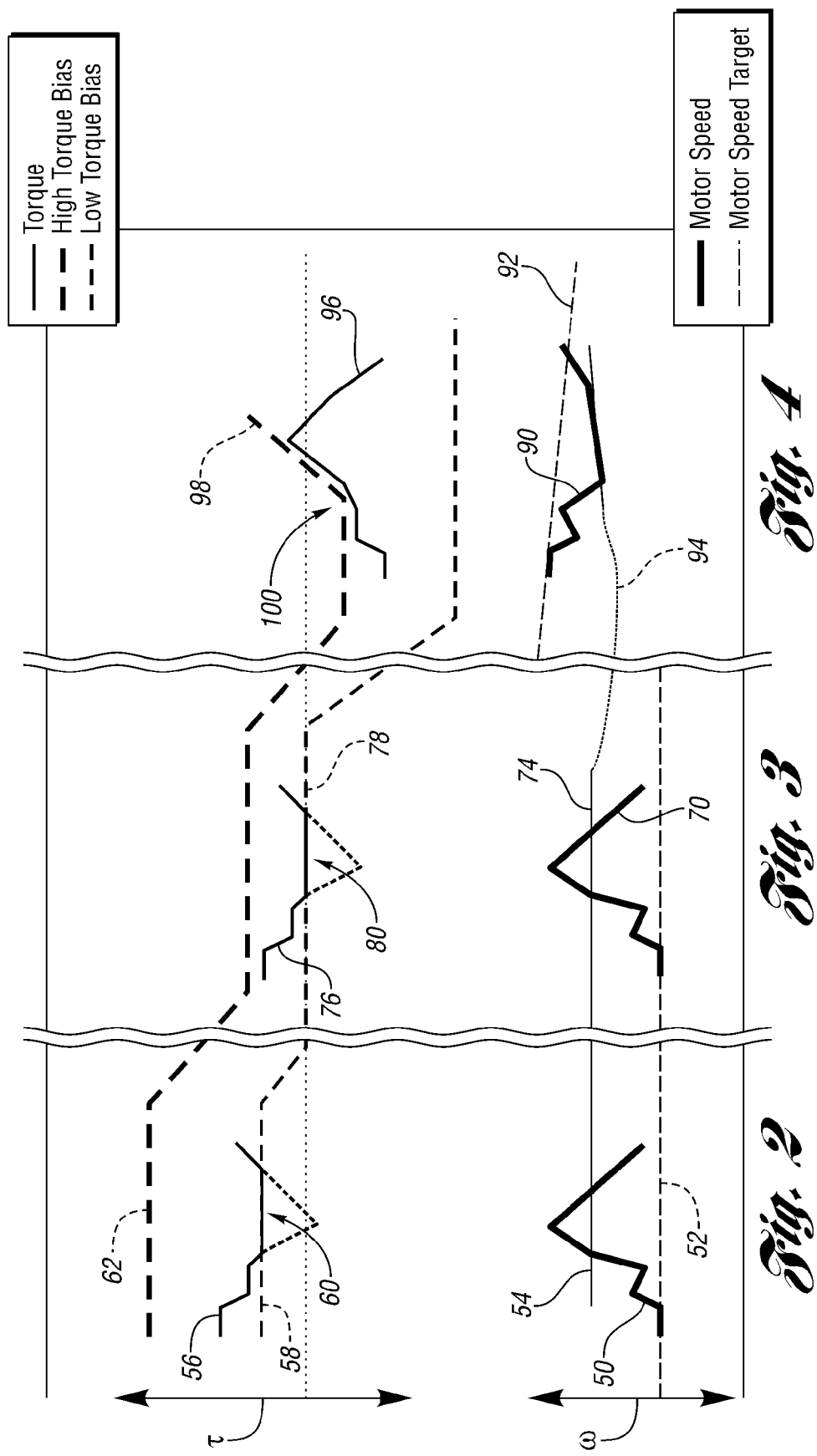

BIASED SPEED CONTROL FOR AN ELECTRIC MACHINE IN A HYBRID VEHICLE

TECHNICAL FIELD

Various embodiments relate to a hybrid vehicle and a method for controlling an electric machine such as a motor/generator in the hybrid vehicle during a clutch engaging event.

BACKGROUND

Hybrid electric vehicles (HEV's) utilize a combination of an internal combustion engine with an electric motor to provide the power needed to propel a vehicle. This arrangement provides improved fuel economy over a vehicle that has only an internal combustion engine. Clutches may be used to control the power flow and during transient vehicle operations, such as pulling up the engine or the electric motor, to provide smooth operation for the driver.

For example, the engine may be shutdown in an HEV during times that the engine operates inefficiently, or is not otherwise needed to propel the vehicle. In these situations, the electric motor is used to provide all of the power needed to propel the vehicle. When the driver power demand increases such that the electric motor can no longer provide enough power to meet the demand, or if the battery state of charge (SOC) drops below a certain level, the engine needs to start quickly and smoothly in a manner that is nearly transparent to the driver to provide additional power for the vehicle. When the vehicle is being propelled by the motor, and an engine start is requested, it is desirable to control the powertrain, i.e. the engine, motor, transmission, etc., such that the flow of torque from the motor to the vehicle wheels is not substantially disrupted thereby causing a torque disturbance felt by a user. Therefore, a need exists for a vehicle, and a method for controlling clutch engaging events in a vehicle, that reduces or eliminates these driveline torque disturbances.

SUMMARY

In one embodiment, a vehicle has an engine, an electric machine connected to the engine by an upstream clutch, a transmission gearbox connected to the electric machine by a downstream clutch, and a controller. The controller is configured to: (i) slip a downstream clutch, (ii) limit a torque output of an electric machine to a threshold value, (iii) engage an upstream clutch while the downstream clutch is slipping, and (iii) engage the downstream clutch.

In another embodiment, a method is provided for controlling an electric machine in a vehicle during an upstream torque disturbance. A downstream clutch is slipped. A torque output of an electric machine is limited to a threshold value. An upstream clutch is engaged while the downstream clutch is slipping. The downstream clutch is engaged.

In yet another embodiment, a method is provided for starting an engine in a hybrid vehicle using an electric machine. A first clutch is slipped while starting the engine. The first clutch connects the electric machine to the engine. The electric machine is operated such that the torque output of the electric machine is biased to operate on one side of a predetermined torque value to maintain slip in a second clutch. The second clutch connects the electric machine to a transmission. The first clutch is engaged when the speed of the electric machine and the speed of the engine are synchronized. The second clutch is engaged after the first clutch is engaged.

Various embodiments according to the present disclosure have associated advantages. For example, embodiments according to the present disclosure provide for connection of an engine to an electric machine when starting or rotating the engine without creating a driveline disturbance caused by a downstream clutch inadvertently engaging. The downstream clutch is slipped during an engine pull up in order to isolate the system. The electric machine is controlled in a speed control mode when the engine is pulled up, and has a torque threshold which is offset from the static capacity of the downstream clutch. This torque threshold prevents the electric machine from producing a torque that would cause the downstream clutch to engage when trying to maintain its designated speed in speed control mode.

BRIEF DESCRIPTION OF THE DRAWINGS

FIG. 2 is a chart of the electric machine speed and torque during an engine start according to an embodiment;

FIG. 3 is another chart of the electric machine speed and torque during an engine start according to an embodiment; and FIG. 4 is yet another chart of the electric machine speed and torque during an engine rotation according to an embodiment.

DETAILED DESCRIPTION

Figure 1:
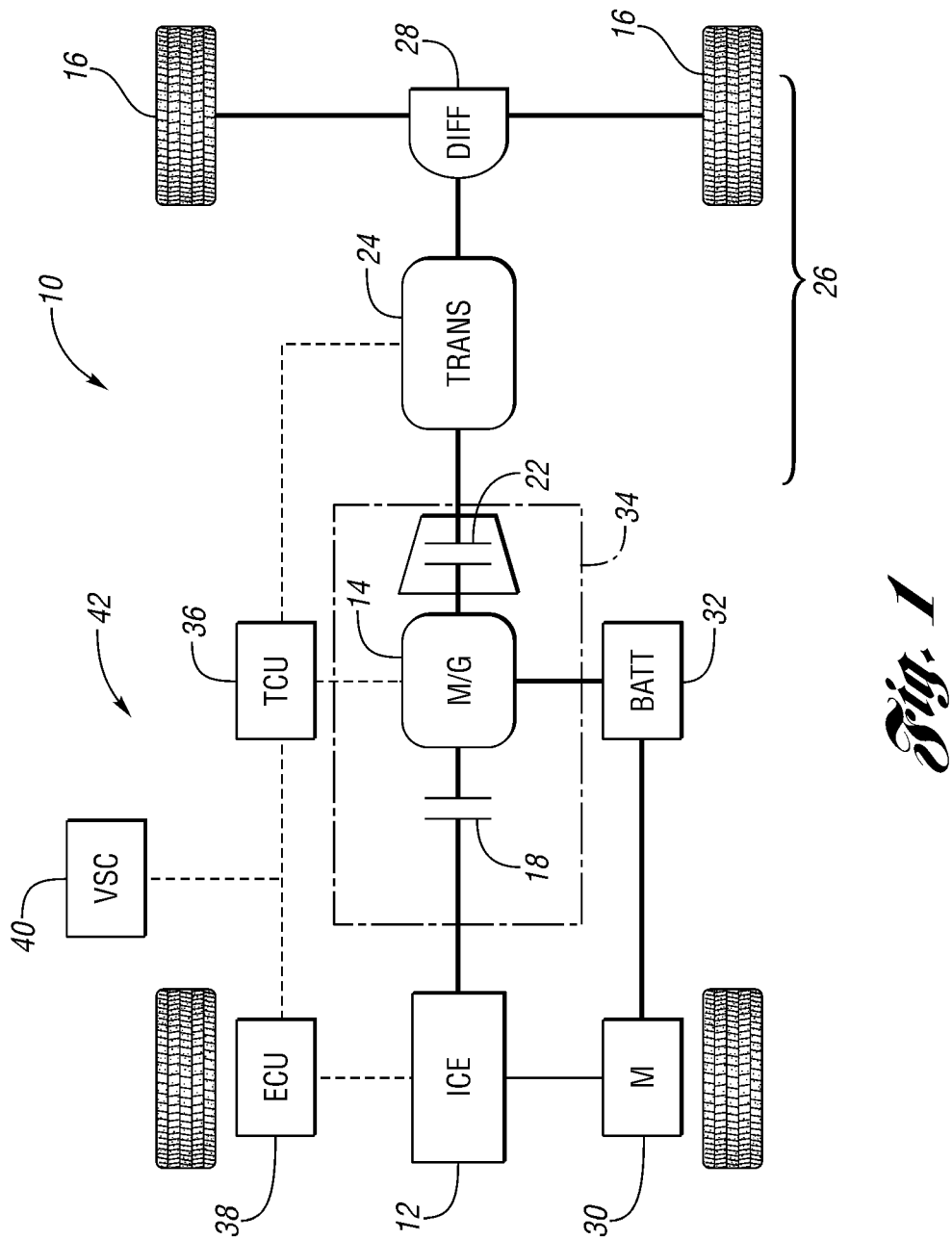
FIG. 1 is a schematic view of a hybrid vehicle capable of implementing an embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

FIG. 1 illustrates a schematic diagram of a hybrid vehicle 10 according to an embodiment. The vehicle 10 includes an engine 12, and an electric machine, which, in the embodiment shown in FIG. 1, is a motor generator (M/G) 14, and alternatively may be a traction motor. The M/G 14 is configured to transfer torque to the engine 12 or to the vehicle wheels 16.

The M/G 14 is connected to the engine 12 using a first clutch 18, also known as a disconnect clutch or the upstream clutch. The clutch 18 may also include a damper mechanism such as a series of plates and springs configured to help dampen changes in torque transferred between the engine 12 and the M/G 14 when the disconnect clutch 18 is being engaged. A second clutch 22, also known as a launch clutch or the downstream clutch, connects the M/G 14 to a transmission 24, and all of the input torque to the transmission 24 flows through the launch clutch 22. The launch clutch 22 may be controlled to isolate the M/G 14 and the engine 12 from components downstream of the launch clutch 22 including the transmission 24, differential 28 and the vehicle drive wheels 16. Although the clutches 18, 22 are described and illustrated as hydraulic clutches, other types of clutches, such as electromechanical clutches may also be used. Alternatively, the clutch 22 may be replaced with a torque converter having a bypass clutch, as described further below. In different embodiments, the downstream clutch 22 refers to various coupling devices for the vehicle 10 including a traditional clutch, and a torque converter having a bypass (lock-out) clutch.

The engine 12 output shaft is connected to the disconnect clutch 18, which in turn is connected to the input shaft for the input shaft to the M/G 14. The M/G 14 output shaft is connected to the launch clutch 22, which in turn is connected to the transmission 24. The launch clutch 22 connects the vehicle prime movers to the driveline 26, which includes the transmission 24, differential 28, and vehicle wheels 16. The components of the vehicle 10 are positioned sequentially in series with one another. In other embodiments, the method described herein may be applied to hybrid vehicle having other system architectures.

For another embodiment of the vehicle 10, the downstream clutch 22 is a torque converter with a bypass clutch. The input from the M/G 14 is the impeller side of the torque converter, and the output from the torque converter to the transmission 24 is the turbine side. The torque converter 22 transfers torque using its fluid coupling, and torque multiplication may occur depending on the amount of slip between the impeller and turbine sides. The bypass or lock-up clutch for the torque converter may be selectively engaged to create a mechanical connection between the impeller side and the turbine side for direct torque transfer. The bypass clutch may be slipped and/or opened to control the amount of torque transferred through the downstream clutch device 22 using the torque converter. The torque converter may also include a lockup clutch.

The engine 12 is a direct injection engine. Alternatively, the engine 12 may be a another type of engine or prime mover, such as a port injection engine or fuel cell, or use various fuel sources, such as diesel, biofuel, natural gas, hydrogen, or the like.

In some embodiments, the vehicle 10 also includes a starter motor 30 operatively connected to the engine 12, for example, through a belt or gear drive. The starter motor 30 may be used to provide torque to start the engine 12 without the addition of torque from the M/G 14, such as for a cold start or some high speed starting events. This isolates the M/G 14 during engine 12 start and may eliminate or reduce torque disturbances that would otherwise occur when torque was transferred from the M/G 14 to the engine 12 to assist the engine start.

The M/G 14 is in communication with a battery 32. The battery 32 may be a high voltage battery. The M/G 14 may be configured to charge the battery 32 in a regeneration mode, for example when vehicle power output exceeds driver demand, through regenerative braking, or the like. In one example the battery 32 is configured to connect to an external electric grid, such as for a plug-in electric hybrid vehicle (PHEV) with the capability to recharge the battery from an electric power grid, which supplies energy to an electrical outlet at a charging station. A low voltage battery may also be present to provide power to the starter motor or other vehicle components, or low voltage power may be provided through a DC to DC converter.

In some embodiments, the transmission 24 is an automatic transmission and connected to the drive wheels 16 in a conventional manner, and may include a differential 28. The vehicle 10 is also provided with a pair of non-driven wheels, however, in alternative embodiments, a transfer case and a second differential can be utilized in order to positively drive all of the vehicle wheels.

The M/G 14 and the clutches 18, 22 may be located within a motor generator case 34, which may be incorporated into the transmission 24 case, or alternatively, is a separate case within the vehicle 10. The transmission 24 has a gear box to provide various gearing ratios for the vehicle 10. The transmission 24 gearbox may include clutches and planetary gearsets, or other arrangements of clutches and gear trains as are known in the art.

The transmission 24 is controlled using a transmission control unit (TCU) 36 or the like to operate on a shift schedule, such as a production shift schedule, that connects and disconnects elements within the gear box to control the ratio between the transmission output and transmission input. The TCU 36 also acts to control the M/G 14, the clutches 18, 22, and any other components within the motor generator case 34.

An engine control unit (ECU) 38 is configured to control the operation of the engine 12. A vehicle system controller (VSC) 40 transfers data between the TCU 36 and ECU 38 and is also in communication with various vehicle sensors. The control system 42 for the vehicle 10 may include any number of controllers, and may be integrated into a single controller, or have various modules. Some or all of the controllers may be connected by a controller area network (CAN) or other system. The control system 42 may be configured to control operation of the various components of the transmission 24, the motor generator assembly 34, the starter motor 30 and the engine 12 under any of a number of different conditions, including in a way that minimizes or eliminates torque disturbances and impact on the driver.

Under normal powertrain conditions (no subsystems/components faulted), the VSC 40 interprets the driver's demands (e.g. PRND and acceleration or deceleration demand), and then determines the wheel torque command based on the driver demand and powertrain limits. In addition, the VSC 40 determines when and how much torque each power source needs to provide in order to meet the driver's torque demand and to achieve the operating point (torque and speed) of the engine 12.

Although the operation of the clutches 18, 22 described uses the term "pressure", thereby implying a hydraulic clutch, other types of devices, such as electromechanical clutches or torque converters may also be used. In the case of hydraulic clutches, the pressure on the clutch plates is related to torque capacity. In the same way, the forces acting on the plates in a non-hydraulic clutch are also related to torque capacity. Therefore, for consistency in nomenclature, unless otherwise specifically defined, the operation of the clutches 18, 22 described herein are in terms of "pressure", though it is understood that it also includes situations where a non-hydraulic force is applied to the clutch plates in a non-hydraulic clutch.

When one of the clutches 18, 22 is locked or engaged, the rotational speeds of the driveline components on either side of the clutch are equal. Slip is the speed difference from one side of a clutch to the other, such that when one of the clutches is slipping, one side has a different speed than the other side. For example, if the M/G 14 output rotational speed is at 1500 rpm and the launch clutch 22 is slipping 100 rpm, the transmission 24 side of the launch clutch 22 is at 1600 rpm. When the downstream clutch 22 is a bypass clutch for a torque converter, it may be also be considered to be slipping when it is fully open since there is a speed differential across the clutch, even when no torque is being transferred through the bypass clutch.

As the pressure in one of the clutches 18, 22 is increased, more torque can be transmitted through the clutch 18, 22. If the pressure is constant, one can increase the torque at one side of the clutch up to a point where the two sides start to slip. At a given pressure for one of the clutches 18, 22, the maximum amount of torque that can be transmitted through the clutch before it begins to slip is the torque capacity or static capacity of the clutch. After the clutch starts slipping at that pressure, the torque capacity remains constant. At a given torque capacity, if the torque is raised on the input side of the clutch, the speed will be raised on that side of the clutch (i.e.

the slip will increase) and the torque transmitted through the clutch will remain the same because the clutch is at capacity. Alternatively, if the clutch is slipping and at a constant pressure, lowering the torque on the input side of the clutch (thus slowing the rotational speed on that side) will slow or stop the slip. At a given torque through the clutch, the clutch will begin to slip or increase slip if you lower the pressure to the clutch. When a clutch is locked at full pressure it is typically designed such that it does not slip with an increase in torque.

In other words, the speed (and torque of torque producers) on one side of the clutch may vary and be disturbed, and when the clutch is slipping, the other side of the clutch is isolated and receives the torque based on the torque capacity of the clutch (i.e. the torque upstream of clutch 22 may vary and the transmission 24 and wheels will receive a constant torque through the clutch 22).

For example, when the launch clutch 22 is at its clutch capacity for a given pressure, i.e. when the clutch 22 is slipped to a pressure sufficient to supply a driver demanded torque to the driveline 26. At this pressure, the clutch 22 is slipping while transmitting torque based on the torque capacity of the clutch at that pressure, and it is ready to be quickly engaged. In this way, the engine 12 and the M/G 14, is ostensibly isolated from the transmission 24 and drive wheels 16, and the vehicle occupants will not be subject to torque disturbances resulting from torque being transferred between the M/G 14 and the engine 12 when connecting the engine 12 to the M/G 14 using the disconnect clutch 18, such as during engine 12 start.

In some embodiments, the starter motor 30 is used to rotate the engine 12 to facilitate the engine 12 start. After the engine 12 is fueled and engine start is detected, the pressure level of the disconnect clutch 18 can be raised to lock the disconnect clutch 18 and connect the M/G 14 to the engine 12. In order to isolate the vehicle wheels 16 from disturbances that may occur during the transfer of torque between the M/G 14 and the engine 12 when the disconnect clutch 18 is engaging or engaged, the launch clutch 22 may be slipped. By controlling the pressure of the launch clutch 22 and controlling the M/G 14 torque output such that the clutch 22 does not lock suddenly from a M/G 14 torque going below the clutch 22 torque capacity, disturbances to the driver may be reduced.

In an alternative embodiments, the clutch 22 may be replaced with a torque converter unit including a torque converter and a lockup clutch or bypass clutch. The torque converter has torque multiplication effects when certain rotational speed differentials exist across the torque converter. During torque multiplication, the output torque of the torque converter is larger than that of the input torque due to torque multiplication across the torque converter. Torque multiplication exists for example, when the vehicle 10 is started from rest and the input shaft to the torque converter begins to rotate, and the output shaft from the torque converter is still at rest or has just begun to rotate.

The lockup clutch or bypass clutch is used to lock out the torque converter such that the input and output torques for the downstream torque transfer device 22 are equal to one another, and the input and output rotational speeds for the device 22 are equal to one another. A locked clutch eliminates slipping and driveline inefficiency across the torque converter, for example, when the rotational speed ratio across the torque converter is greater than approximately 0.8.

The M/G 14 may be placed in a speed control or torque control mode where the torque provided by the M/G 14 is allowed to go either positive or negative, or bidirectional, in order to maintain the designated speed of the M/G 14. Speed control mode in this disclosure refers to controlling the M/G 14 to operate at a designated speed, which may be accomplished through either a mode to directly control ther M/G 14 speed, or through a torque control mode providing the necessary torque to control the M/G 14 to a designated speed.

For example, in order to maintain isolation of the driveline 26 to reduce torque disturbances during an engine 12 start, the launch clutch 22 may be slipped 50 or 100 rpm by lowering the pressure to the clutch 22. The slip is maintained by the torque of the M/G 14 being slightly greater than the speed of the driveline 26. So at a constant pressure, the torque of the M/G 14 must be equal to or slightly greater than torque capacity of the clutch 22. If the torque of the M/G 14 drops below the torque capacity of the clutch 22 or bypass clutch in a torque converter configuration, the clutch 22 may lock at an inappropriate moment thereby causing a torque disturbance that may be felt by the user.

For example, when the M/G 14 is in a bidirectional torque mode in speed control with a designated speed of 1500 rpm and the actual speed of the M/G 14 goes above 1500 rpm, the M/G 14 would be controlled by decreasing the torque until the speed came down to its designated value of 1500 rpm. Conversely, if the speed of the M/G 14 decreased below its designated value in speed control mode, the M/G 14 torque would be commanded to increase such that the speed of the M/G 14 would increase to 1500 rpm.

In another example, when the M/G 14 is in a unidirectional torque mode in speed control, the torque may be controlled such that it can only changed in a positive or negative direction, but not both. So when the M/G 14 is in a positive only, unidirectional torque mode in speed control with a designated speed of 1500 rpm and the actual speed of the M/G 14 goes above 1500 rpm, the torque will not be decreased (or go negative), and the speed of the M/G 14 may continue to rise. If the speed drops below the designated value of 1500 rpm, a positive torque for the M/G 14 will be commanded to increase the speed back to its designated value of 1500 rpm.

In a biased torque mode, as described below, the M/G 14 may be placed in a speed control mode with a torque threshold or bias, which may be a high torque threshold (ceiling) and/or a low torque threshold (floor). The torque ceiling may be a positive or negative torque value. The torque floor may also be a positive or negative torque value. The M/G 14 may be placed in speed control with a torque ceiling and a torque floor, or only one of the two, and the M/G may be controlled differently based on the operating state of the vehicle 10.

For example, if the M/G 14 is operating with a low torque bias or floor of −20 Nm (Newton-meters) and the speed goes above its designated value of 1500 rpm, the torque provided by the M/G 14 would be commanded to decrease to bring the speed back to 1500 rpm, but the torque can only be decreased to −20 Nm and not below this threshold or floor. If a negative torque in the range of zero to −20 Nm is sufficient, the speed of the M/G 14 will be brought back to 1500 rpm. However, if the bias of −20 Nm is insufficient to bring the speed of the M/G back to 1500 rpm, the speed will continue to increase.

Conversely, when the M/G 14 is in a speed control mode with a torque bias or threshold acting as a ceiling, if the speed of the M/G 14 drops below 1500 rpm, the torque is commanded to increase to bring the speed of the M/G 14 back to 1500 rpm. The torque cannot be increased beyond its torque ceiling, even if this means that the M/G 14 will be operating below its designated speed.

In another example, the torque floor is set to a positive number, such that the M/G 14 is in speed control mode with a positive low bias. The floor may be set to +80 Nm, and the designated speed of the M/G 14 is 1500 rpm. If the speed of the M/G 14 increases above 1500 rpm, the torque is commanded to drop to decrease the speed down to its floor of +80 Nm, which may or may not cause the speed of the M/G 14 to decrease back to 1500 rpm.

This biased speed control mode for the M/G 14 may be used in the vehicle 10 for example when the electric machine 14 is in speed control and assisting in lifting the engine 12, but not impeding the engine 12 when it makes more torque and increases the overall speed.

For example, with the vehicle 10 as shown in FIG. 1, if the launch clutch 22 is locked and the torque to the driveline is 75 Nm, the clutch 22 must have a minimum torque capacity of 75 Nm to avoid slipping. In order to isolate the driveline 26, the clutch 22 may be slipped by lowering the clutch pressure and torque capacity until the clutch 22 begins to slip or by increasing the torque output of the M/G 14 above 75 Nm, the clutch 22 torque capacity. While the clutch 22 is slipping and the driveline 26 is being isolated, the driveline 26 of car may be commanded to remain at 75 Nm such that the clutch 22 torque capacity is approximately 75 Nm. If the torque output of the electric machine 14 increases or decreases (but remains above 75 Nm), the speed on the M/G 14 side of the clutch 22 will increase or decrease, but the speed on the driveline 26 side and torque through the clutch 22 will remain the same because the clutch is slipping. If the M/G 14 torque output is allowed to decrease below 75 Nm, the clutch 22 will lock as the torque input will be below the torque capacity of the clutch 22 at that time.

To prevent unwanted locking or engagement of the clutch 22, the M/G 14 torque may be limited to a torque floor or low bias of +80 Nm, or some other value slightly above the torque capacity of the clutch 22, i.e. 75 Nm. This offset provides a reserve to maintain slip in the clutch 22 and driveline 26 speed, while preventing locking of the clutch 22 caused by a low torque output from the M/G 14. Therefore, when the engine 12 is brought online and the M/G 14 speed increases without a torque decrease to bring it back to its designated speed value, the slip of the clutch 22 will increase, but the user is unaware as the clutch 22 slipping and its capacity transmits the 75 Nm to meet vehicle demand. The increased speed of the M/G 14 is a transient situation, as once the engine 12 is brought online and connected to the M/G 14 via the disconnect clutch 18, the pressure and torque capacity of the clutch 22 may be increased to increase the load on the M/G 14 and operate the vehicle 10 normally.

The various embodiments for the vehicle 10 and control of the vehicle 10 described below are described with respect to a traditional clutch 22 arrangement; however, a torque converter device may be used in place of the clutch 22 and some differences in implementation are described as appropriate.

FIG. 2 illustrates an example of an engine 12 start when the vehicle 10 is in motion. With the vehicle 10 in motion, the transmission 24 requires torque through the launch clutch 22 such that the vehicle 10 continues to be propelled. Since the engine 12 has not been operating, the process begins with the disconnect clutch 18 open, and the M/G 14 propelling the vehicle 10 through an engaged launch (or bypass) clutch 22 or the torque converter. The launch clutch 22 is slipped in order to isolate the driveline 26. The engine 12 may be started by the starter motor 30 while the disconnect clutch 18 remains opened. The disconnect clutch 18 is then controlled to engagement to connect the engine 12 and M/G 14. Alternatively, the M/G 14 may provide the torque to pull up the engine 12, where the disconnect clutch 18 is slipped while the M/G 14 pulls up the engine 12, and after an engine 12 start, the disconnect clutch 18 may be engaged to connect the engine 12 and the M/G 14. The M/G 14 will have to provide both the torque to meet driver demand as well as the torque needed to pull up the engine 12. The M/G 14 is in speed control mode during this process to provide the torque to the driveline 26 to satisfy the driver demand, and the torque to pull up the engine 12.

The engine 12 start and disconnect clutch 18 engagement occurs while the launch clutch 22 is slipping. A minimum torque input to the launch clutch 22 needs to be met while the launch clutch 22 is being slipped in order to satisfy vehicle demand. Additionally, sufficient torque needs to be provided to the launch clutch 22 such that it does not lock up by going below the torque capacity of the clutch 22, less the torque needed to pull up the engine 12 through the disconnect clutch 18, while slipping, thereby maintaining isolation of the driveline 26.

The M/G 14 speed is illustrated by line 50 with respect to the designated target motor speed 52 as determined through the speed control mod. The M/G 14 may also have a controllable motor speed limit 54. The M/G 14 is initially at its designated target speed, and as the engine 12 is being pulled up, the torque to the launch clutch 22 begins to decrease as shown by the torque line 56. The torque is permitted to decrease until it reaches a low torque bias at 58. The low torque bias at 58 is set to be above, or offset from, the torque capacity of the clutch 22, thereby preventing an engagement. With the torque clipped to the bias as shown by 60, the motor speed increases as seen in line 50. The engine 12 may be controlling the speed at this point. The engine 12 speed is controlled so it does not over torque.

Once the engine 12 is online and connected through the disconnect clutch 18, the speeds of the engine 12 and M/G 14 may be reduced, and the torque will climb away from the low bias 58. The launch clutch 22 may be controlled to engagement for direct torque transfer to the driveline 26.

In region 60, where the torque 56 is clipped to the low bias 58, the M/G 14 speed uncontrollably rises even though the M/G 14 is in speed control. This is acceptable because of the short time and transient nature of the engine pull up.

When the vehicle 10 has a torque converter device 22, the bypass clutch is open during the engine 12 pull up and the speed into the torque converter needs to be controlled to a target speed, as that controls the torque to the driveline. With a torque converter there may also be a high torque bias as shown by line 62. This prevents the bypass clutch for the torque converter or any transmission clutches from overrunning.

FIG. 3 illustrates an example of an engine 12 start when the vehicle 10 is at rest or is stationary, where the launch clutch 22 needs to be slipped such that the engine 12 can be started and reach an idle speed with only a creep torque provided to the vehicle driveline 26. Creep torque is the torque needed to propel the vehicle 10 at creep, or very low speeds, such as when the user releases a brake and does not make a power demand.

Since the engine 12 has not been operating, the process begins with the disconnect clutch 18 open. The launch clutch 22 is slipped in order to isolate the driveline 26 and provide the capacity for the creep torque. The engine 12 may be started by the starter motor 30 while the disconnect clutch 18 remains opened. The disconnect clutch 18 is then controlled to engagement to connect the engine 12 and M/G 14. Alternatively, the M/G 14 may be used to provide the torque to pull up and start the engine 12 by slipping the disconnect clutch 18, and after an engine 12 start, the disconnect clutch 18 may be engaged to connect the engine 12 and the M/G 14. The M/G 14 will have to provide both the torque to meet driver demand (creep torque) as well as the torque needed to pull up the engine 12. The M/G 14 is in speed control mode during this process in order to provide the creep torque as well as the torque needed to pull up the engine 12.

The engine 12 pull up and disconnect clutch 18 engagement occurs while the launch clutch 22 is slipping. The launch clutch 22 is slipping to allow the engine 12 to get to its idle speed while not moving the vehicle 10. As the engine 12 comes on line and becomes a torque producer, the M/G 14 torque that was maintaining the idle speed begins to drop, and if the M/G 14 torque drops too low, the launch clutch 22 may lock up by going below the torque capacity of the clutch 22.

The M/G 14 speed is illustrated by line 70 with respect to the designated target motor speed 72 as determined through speed control. The M/G 14 may also have a controllable motor speed limit 74. The M/G 14 is initially at its target speed 72, and as the engine 12 is being pulled up and becomes a torque producer, the M/G 14 torque to the launch clutch 22 begins to decrease as shown by the torque line 76. The torque is permitted to decrease until it reaches a low torque bias at 78. The low torque bias 78 is set to be offset above the torque capacity of the clutch 22, thereby preventing an engagement. The engine 12 may be deemed started when the M/G 14 torque 76 is near zero.

With the torque clipped to the bias as shown by 80, the M/G 14 speed increases as seen in line 70. The engine 12 may be controlling the speed at this point. The engine 12 speed may be controlled so it does not over torque. In region 80, where the torque 76 is clipped to the low bias, the M/G 14 speed uncontrollably rises. This is acceptable because of the short time and transient nature of the engine 12 pull up. Once the engine 12 is online and connected through the disconnect clutch 18, the speeds of the engine 12 and M/G 14 may be reduced to an idle speed, and the torque will climb away from the low bias 78. The launch clutch 22 continues to be controlled to a capacity with the engine 12 at idle speed such that vehicle 10 remains at rest and the appropriate creep torque is available to the driveline 26.

FIG. 4 illustrates an example of the engine 12 being motored unfueled during a regeneration event to provide powertrain braking, such as when the battery 32 is at its maximum designated charge capacity and the vehicle 10 is going downhill.

With a need to motor the engine 12, the launch clutch 22 needs to be slipped such that the engine 12 may be connected to the rest of the driveline 26 using the disconnect clutch 18. Since the engine 12 has not been operating, the process begins with the disconnect clutch 18 open. The launch clutch 22 is slipped in order to isolate the driveline 26 while allowing the engine 12 to be brought up to a generally synchronous speed. The engine 12 may be rotated by the starter motor 30 while the disconnect clutch 18 remains opened. The disconnect clutch 18 is then controlled to engagement to connect the engine 12 and M/G 14. Alternatively, the disconnect clutch 18 may be slipped to use the M/G 14 to rotate the engine 12 to a generally synchronous speed, and the disconnect clutch 18 may then be engaged to connect the engine 12 and the M/G 14. The M/G 14 is in speed control mode during this process and if the M/G 14 torque rises too high, the launch clutch 22 may lock up by going below the torque capacity of the clutch, which may in turn cause a driveline 26 disturbance noticeable to a driver.

The launch clutch 22 is slipping while engine being motored to a synchronous speed and the disconnect clutch 18 engagement occurs. The M/G 14 speed is illustrated by line 90 with respect to the designated target motor speed 92 as determined through the speed control mode. The M/G 14 may also have a controllable motor speed limit 94. Note that the limit 94 is illustrated below the control target 92 as the M/G 14 is providing negative torque since it is acting as a generator.

The M/G 14 is initially at its designated target speed, and as the engine 12 is motored, the negative M/G 14 torque to the launch clutch 22 begins to trend towards zero as shown by the torque line 96. The torque is permitted to rise, or become less negative, until it reaches a high torque bias at 98. The torque bias 98 is set as a high torque bias because it is on the negative torque side. The high torque bias at 78 is set to be more negative than the torque capacity of the clutch 22, thereby preventing an engagement.

With the torque clipped to the bias as shown by 100, the M/G 14 speed is slower as seen in line 90 as the M/G 14 rotates slower than the driveline 26. In region 100, the high bias 98 may vary and be controlled and changed as the engine 12 torque becomes available via the disconnect clutch 18 connection, and the M/G 14 torque is brought towards zero. The launch clutch 22 may be controlled to engagement such that the motoring engine 12 provides the braking torque as necessary.

When the vehicle 10 has a torque converter, no torque multiplication occurs when torque is going from the wheels 16, through the driveline 26 and to the M/G 14; however, regeneration can still be conducted through a torque converter with an open bypass clutch.

For example, various embodiments according to the present disclosure provide for connection of an engine to an electric machine when starting the engine without creating a driveline disturbance caused by a downstream clutch engaging. The downstream clutch is slipped during an engine pull up in order to isolate the system. The electric machine is controlled in a speed control mode when the engine is pulled up, but has a torque threshold which is offset from the static capacity of the downstream clutch to prevent the electric machine from producing a torque that would cause the clutch to engage when trying to maintain its designated speed in speed control mode.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
  an engine;
  an electric machine connected to the engine by an upstream clutch;
  a transmission gearbox connected to the electric machine by a downstream clutch; and
  a controller configured to: (i) slip a downstream clutch, (ii) limit a torque output of an electric machine to a threshold value to isolate a driveline upstream of the downstream clutch and prevent locking the downstream clutch while the downstream clutch pressure is maintained, (iii) engage an upstream clutch while the downstream clutch is slipping, and (iii) engage the downstream clutch.

2. The vehicle of claim 1 wherein the downstream clutch, the electric machine, the upstream clutch, and the engine are positioned in series with one another.

3. The vehicle of claim 1 wherein the controller is configured to control the electric machine to a designated rotational speed when the torque output of the electric machine has not reached the threshold value.

4. The vehicle of claim 3 wherein the controller is configured to limit a torque output of an electric machine to a threshold value by allowing the rotational speed of the electric machine to vary from the designated rotational speed.

5. The vehicle of claim 1 wherein the threshold value is a bias offset from the torque capacity of the downstream clutch.

6. The vehicle of claim 1 further comprising a torque converter, wherein the downstream clutch is a bypass clutch for the torque converter.

7. The vehicle of claim 1 wherein an output speed of the downstream clutch is the transmission gearbox input speed.

8. The vehicle of claim 1 wherein the controller is configured to set the threshold value to be positive; and
wherein the controller is configured to limit the torque output of the electric machine to above the threshold value when the vehicle is in motion.

9. The vehicle of claim 1 wherein the controller is configured to set the threshold value to be zero; and
wherein the controller is configured to limit the torque output of the electric machine to above the threshold value when the vehicle is starting from rest.

10. The vehicle of claim 1 wherein the controller is configured to set the threshold value to be negative; and
wherein the controller is configured to limit the torque output of the electric machine to below the threshold value during a regeneration event.

11. A method for controlling an electric machine in a vehicle during an upstream torque disturbance, the method comprising:
slipping a downstream clutch;
limiting a torque output of an electric machine to a threshold value to isolate a driveline upstream of the downstream clutch and prevent locking the downstream clutch while maintaining the downstream clutch pressure;
engaging an upstream clutch while the downstream clutch is slipping; and
engaging the downstream clutch.

12. The method of claim 11 wherein the threshold value is a bias offset from the torque capacity of the downstream clutch.

13. The method of claim 11 wherein the threshold value is positive; and
wherein the torque output of the electric machine is limited to above the threshold value when the vehicle is in motion.

14. The method of claim 11 wherein the threshold value is zero; and
wherein the torque output of the electric machine is limited to above the threshold value when the vehicle is starting from rest.

15. The method of claim 11 wherein the threshold value is negative; and
wherein the torque output of the electric machine is limited to below the threshold value during a vehicle regeneration event.

16. The method of claim 11 further comprising limiting the torque output of the electric machine to a second threshold value such that the torque output of the electric machine is bracketed by the first and second threshold values.

17. The method of claim 11 wherein the upstream torque disturbance is caused by starting an engine and connecting the engine to the electric machine using the upstream clutch.

18. The method of claim 11 wherein the downstream clutch is a bypass clutch for a torque converter.

19. A method for starting an engine in a hybrid vehicle using an electric machine, the method comprising:
slipping a first clutch while starting the engine, the first clutch connecting the electric machine to the engine;
operating the electric machine such that the torque output of the electric machine is biased to operate on one side of a predetermined torque value to maintain slip in a second clutch, the second clutch connecting the electric machine to a transmission;
engaging the first clutch when the speed of the electric machine and the speed of the engine are synchronized; and
engaging the second clutch after the first clutch is engaged.

* * * * *